United States Patent [19]

Weder

[11] Patent Number: 5,752,360

[45] Date of Patent: May 19, 1998

[54] METHOD FOR WRAPPING A FLOWER POT WITH A SHEET MATERIAL CONSTRUCTED OF PAPER AND HAVING A PATTERN EMBOSSED THEREON

[75] Inventor: Donald E. Weder, Highland, Ill.

[73] Assignee: Southpac Trust International, Inc.

[21] Appl. No.: 480,657

[22] Filed: Jun. 7, 1995

Related U.S. Application Data

[63] Continuation of Ser. No. 84,050, Jun. 29, 1993, abandoned, which is a continuation-in-part of Ser. No. 968,798, Oct. 30, 1992, Pat. No. 5,369,934, which is a continuation of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, said Ser. No. 84,050, is a continuation-in-part of Ser. No. 965,585, Oct. 23, 1992, abandoned, which is a continuation of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned, said Ser. No. 84,050, is a continuation-in-part of Ser. No. 968,702, Oct. 30, 1992, abandoned, which is a continuation of Ser. No. 865,504, Apr. 9, 1992, Pat. No. 5,239,804, which is a continuation of Ser. No. 658,413, Feb. 15, 1991, Pat. No. 5,111,637, which is a continuation of Ser. No. 391,463, Aug. 9, 1989, abandoned, said Ser. No. 84,050, is a continuation-in-part of Ser. No. 923,202, Oct. 13, 1993, Pat. No. 5,596,862, which is a continuation-in-part of Ser. No. 803,318, Dec. 4, 1991, Pat. No. 5,344,016, which is a continuation-in-part of Ser. No. 707,417, May 28, 1991, abandoned, which is a continuation of Ser. No. 502,358, Mar. 29, 1990, abandoned.

[51] Int. Cl.$^6$ .................... B65B 61/00; B65B 11/02; B65B 25/02
[52] U.S. Cl. .................... 53/397; 53/410; 53/411; 53/459; 53/464; 53/465
[58] Field of Search .................... 53/397, 398, 410, 53/411, 452, 453, 456, 461, 465, 464, 459; 47/72; 229/3.5 R, 87.01

[56] References Cited

U.S. PATENT DOCUMENTS

Re. 21,065  5/1939  Copeman .
682,817  9/1901  Shaner .
732,889  7/1903  Paver .
898,273  9/1908  Sigler et al. .
1,446,563  2/1923  Hughes .
1,525,015  2/1925  Weeks .
1,818,198  8/1931  Davis .
1,863,216  6/1932  Wordingham .
1,868,283  7/1932  Fleischer .
1,962,722  6/1934  Krueger .
1,978,631  10/1934  Herrlinger .
2,028,878  1/1936  Rider .
2,048,123  7/1936  Howard .
2,094,349  9/1937  Carlson .
2,170,147  8/1939  Lane .
2,278,673  4/1942  Savada et al. .
2,294,670  9/1942  Krueger .
2,302,259  11/1942  Rothfuss .
2,337,808  12/1943  Ford .
2,355,559  8/1944  Renner .

(List continued on next page.)

FOREIGN PATENT DOCUMENTS 2610604  8/1988  France .
345464  12/1921  Germany .

OTHER PUBLICATIONS

Speed Cover® Brochure, 1989, Highland Supply Corp. Highland, IL.

Speed Sheets™ and Speed Rolls, 1990 Highland Supply, Highland, IL.

Primary Examiner—Horace M. Culver
Attorney, Agent, or Firm—Dunlap & Codding, P.C.

[57] ABSTRACT

A method for wrapping a floral grouping or flower pot or both wherein a sheet of material constructed of paper and having a pattern embossed thereon and a printed pattern in register with the embossed pattern printed on the embossed pattern is wrapped about at least a portion of the floral grouping or the flower pot or both. The sheet of material may be provided in the form of a pad of a plurality of sheets of material or a roll wherein the sheets of material are separated from the roll of material.

15 Claims, 5 Drawing Sheets

U.S. PATENT DOCUMENTS

| | | |
|---|---|---|
| 2,371,985 | 3/1945 | Freilberg . |
| 2,377,295 | 5/1945 | Cook . |
| 2,411,328 | 11/1946 | MacNab . |
| 2,435,739 | 2/1948 | Cutler . |
| 2,469,030 | 5/1949 | Brown . |
| 2,510,120 | 6/1950 | Leander . |
| 2,529,060 | 11/1950 | Trillich . |
| 2,540,090 | 2/1951 | Brackney . |
| 2,546,522 | 3/1951 | Quackenbush . |
| 2,552,948 | 5/1951 | Ferrato . |
| 2,577,183 | 12/1951 | Denton . |
| 2,605,740 | 8/1952 | Taylor et al. . |
| 2,621,142 | 12/1952 | Wetherell . |
| 2,782,756 | 2/1957 | Hunt . |
| 2,806,443 | 9/1957 | Horn et al. . |
| 2,822,287 | 2/1958 | Avery . |
| 2,846,060 | 8/1958 | Yount . |
| 2,850,842 | 9/1958 | Eubank, Jr. . |
| 2,883,262 | 4/1959 | Borin . |
| 3,022,605 | 2/1962 | Reynolds . |
| 3,034,476 | 5/1962 | Didde et al. . |
| 3,057,326 | 10/1962 | Jeddeloh . |
| 3,121,647 | 2/1964 | Harris et al. . |
| 3,130,113 | 4/1964 | Silman . |
| 3,271,922 | 9/1966 | Wallerstein . |
| 3,368,522 | 2/1968 | Cordis . |
| 3,376,666 | 4/1968 | Leonard . |
| 3,455,274 | 7/1969 | Modersohn . |
| 3,508,372 | 4/1970 | Wallerstein . |
| 3,620,366 | 11/1971 | Parkinson . |
| 3,681,105 | 8/1972 | Milutin et al. . |
| 3,754,642 | 8/1973 | Stidolph . |
| 3,767,104 | 10/1973 | Bachman et al. . |
| 3,793,799 | 2/1974 | Howe et al. . |
| 3,924,561 | 12/1975 | Ruthart et al. . |
| 4,054,697 | 10/1977 | Reed et al. . |
| 4,118,890 | 10/1978 | Shore . |
| 4,216,620 | 8/1980 | Weder et al. . |
| 4,280,314 | 7/1981 | Stuck . |
| 4,297,811 | 11/1981 | Weder et al. . |
| 4,300,312 | 11/1981 | Weder et al. . |
| 4,333,267 | 6/1982 | Witte . |
| 4,380,564 | 4/1983 | Cancino et al. . |
| 4,413,725 | 11/1983 | Bruno et al. . |
| 4,546,875 | 10/1985 | Zweber . |
| 4,640,079 | 2/1987 | Stuck . |
| 4,660,502 | 4/1987 | Scott . |
| 4,733,521 | 3/1988 | Weder et al. . |
| 4,765,464 | 8/1988 | Ristvedt . |
| 4,773,182 | 9/1988 | Weder et al. . |
| 5,111,637 | 5/1992 | Weder et al. . |
| 5,111,638 | 5/1992 | Weder . |
| 5,181,364 | 1/1993 | Weder . |
| 5,245,814 | 9/1993 | Weder . |
| 5,336,475 | 8/1994 | Weder et al. . |
| 5,336,476 | 8/1994 | Weder . |
| 5,369,934 | 12/1994 | Weder . |
| 5,381,642 | 1/1995 | Weder et al. . |

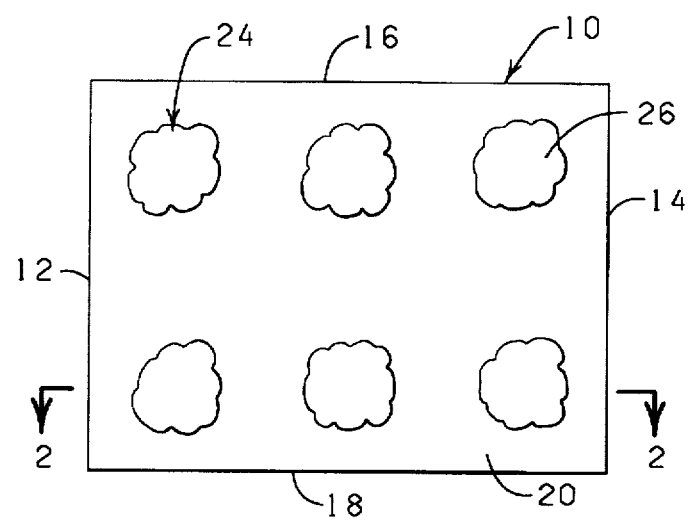
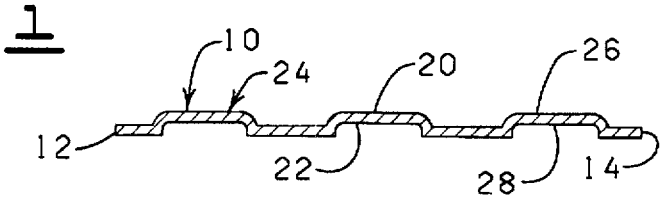
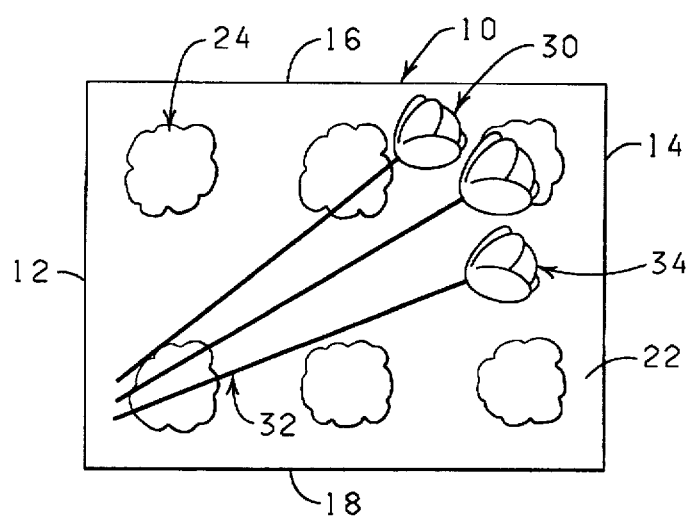
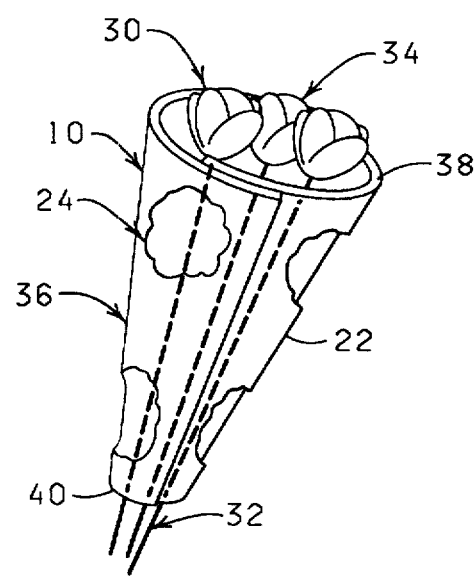

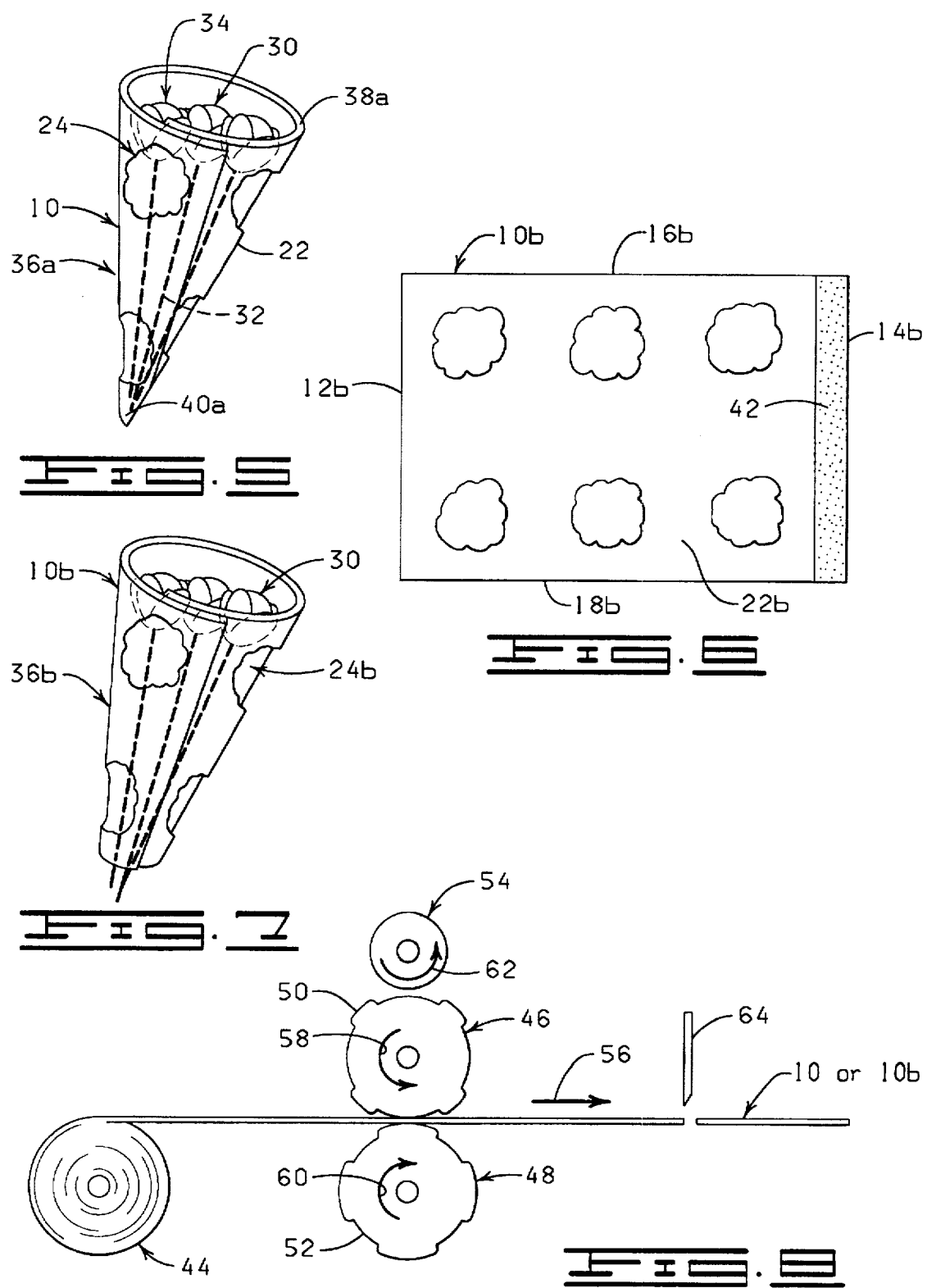

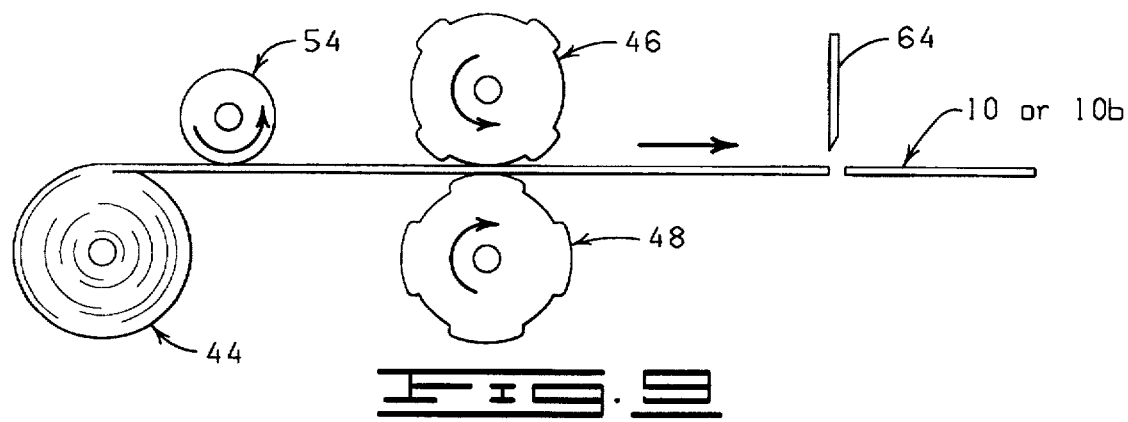
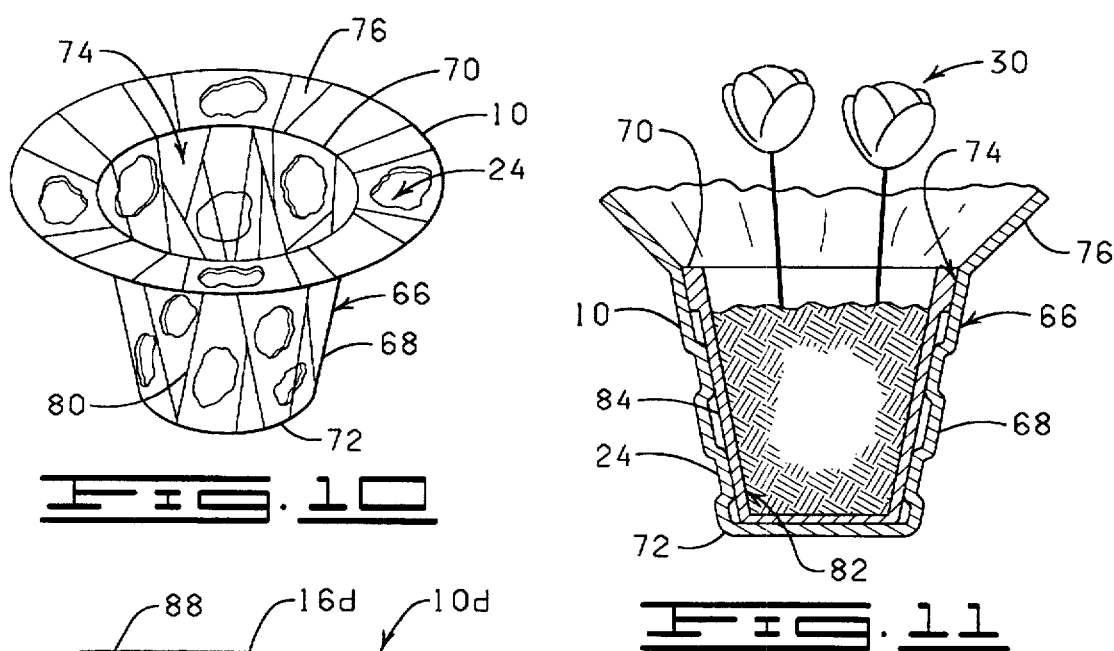
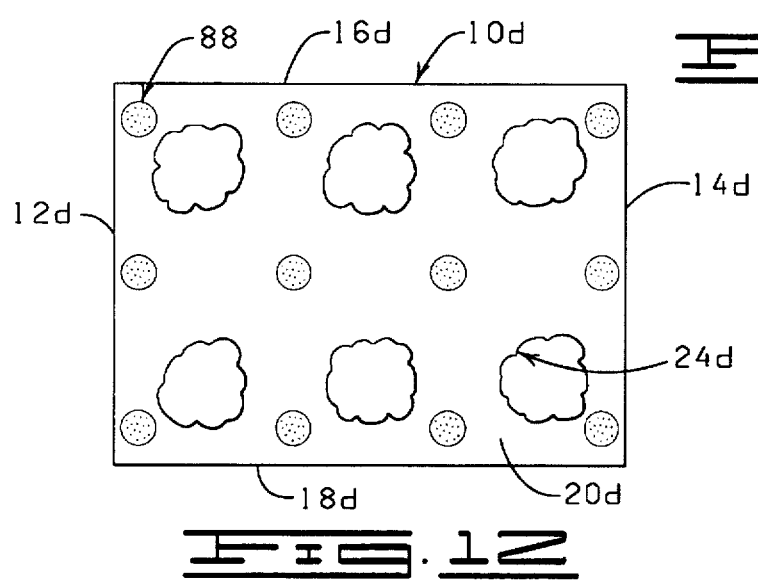

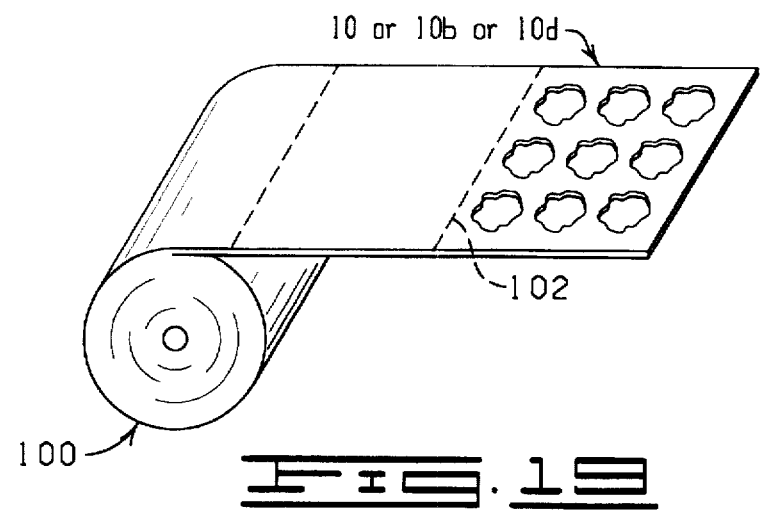
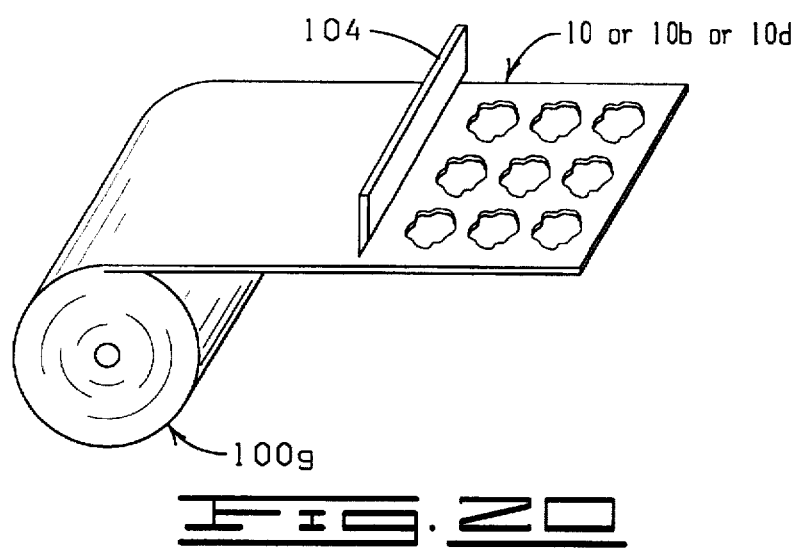
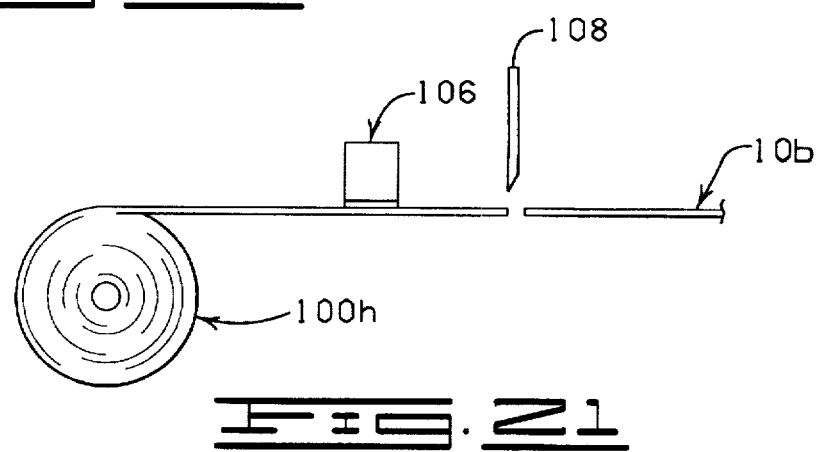

METHOD FOR WRAPPING A FLOWER POT WITH A SHEET MATERIAL CONSTRUCTED OF PAPER AND HAVING A PATTERN EMBOSSED THEREON

This application is a continuation of application U.S. Ser. No. 08/084,050, filed Jun. 29, 1993, entitled "METHOD FOR WRAPPING A FLORAL GROUPING OR FLOWER POT OR BOTH WITH A SHEET OF MATERIAL CONSTRUCTED OF PAPER AND HAVING A PATTERN EMBOSSED THEREON", AND NOW ABANDONED; which is a continuation-in part of U.S. Ser. No. 07/968,798, filed Oct. 30, 1992 entitled "METHOD FOR WRAPPING AN OBJECT WITH A MATERIAL HAVING PRESSURE SENSITIVE ADHESIVE THEREON", now U.S. Pat. No. 5,369,934 issued Dec. 6, 1994; which is a continuation of U.S. Ser. No. 07/865,563, filed Apr. 9, 1992, entitled "METHOD FOR WRAPPING AN OBJECT WITH A MATERIAL HAVING PRESSURE SENSITIVE ADHESIVE THEREON", now U.S. Pat. No. 5,245,814 issued Sep. 21, 1993; which is a continuation of U.S. Ser. No. 07/649,379, filed Jan. 31, 1991, entitled, "METHOD FOR WRAPPING AN OBJECT WITH A MATERIAL HAVING PRESSURE SENSITIVE ADHESIVE THEREON", now U.S. Pat. No. 5,111,638, issued May 12, 1992; which is a continuation of U.S. Ser. No. 07/249,761, filed Sep. 26, 1988, entitled "METHOD AND APPARATUS FOR COVERING PORTIONS OF AN OBJECT WITH A SHEET OF MATERIAL HAVING PRESSURE SENSITIVE AND COATING APPLIED TO AT LEAST A PORTION OF AT LEAST ONE SURFACE OF THE SHEET OF MATERIAL", now abandoned.

Said application Ser. No. 08/084,050 is also a continuation-in-part of U.S. Ser. No. 07/965,585, filed Oct. 23, 1992, entitled, "WRAPPING A FLORAL GROUPING WITH SHEETS HAVING ADHESIVE OR COHESIVE MATERIAL APPLIED THERETO", now abandoned; which is a continuation of U.S. Ser. No. 07/893,586, filed Jun. 2, 1992, entitled "WRAPPING A FLORAL GORUPING WITH SHEETS HAVING ADHESIVE OR COHESIVE MATERIAL APPLIED THERETO"; now U.S. Pat. No. 5,181,364, issued Jan. 26, 1993; which is a continuation of U.S. Ser. No. 07/707,417, filed May 28, 1991, entitled "WRAPPING A FLORAL GROUPING WITH SHEETS HAVING ADHESIVE OR COHESIVE MATERIAL APPLIED THERETO", now abandoned; which is a continuation of U.S. Ser. No. 07/502,358, filed Mar. 29, 1990, entitled "WRAPPING A FLORAL GROUPING WITH SHEETS HAVING ADHESIVE OR COHESIVE MATERIAL APPLIED THERETO", now abandoned.

Said application Ser. No. 08/084,050 is a continuation-in-part of U.S. Ser. No. 07/968,702, filed Oct. 30, 1992, entitled "METHOD FOR WRAPPING A FLORAL GROUPING", now abandoned; which is a continuation of U.S. Ser. No. 07/865,504, filed Apr. 9, 1992, entitled "METHOD FOR WRAPPING A FLORAL GROUPING", now U.S. Pat. No. 5,239,804 issued Aug. 31, 1993; which is a continuation of U.S. Ser. No. 07/658,413, filed Feb. 15, 1991, entitled "METHOD FOR WRAPPING A FLORAL GROUPING", now U.S. Pat. No. 5,111,637, issued May 12, 1992; which is a continuation of U.S. Ser. No. 07/391,463, filed Aug. 9, 1989, now abandoned.

Said application Ser. No. 08/084,050 is a continuation-in-part of U.S. Ser. No. 07/923,202, filed Oct. 13, 1992, entitled "METHOD AND APPARATUS FOR WRAPPING A FLORAL GROUPING WITH A MULTIPLE SHEET WRAPPER", now U.S. Pat. No. 5,596,862, issued Jan. 28, 1997; which is a continuation-in-part of U.S. Ser. No. 07/803,318, filed Dec. 4, 1991, entitled "WRAPPING MATERIAL FOR WRAPPING A FLORAL GROUPING HAVING STAGGERED STRIPS OF ADHESIVE MATERIAL APPLIED THERETO AND METHOD", now U.S. Pat. No. 5,344,016 issued Sep. 6, 1994; which is a continuation-in-part of U.S. Ser. No. 07/707,417, filed May 28, 1991, entitled "WRAPPING A FLORAL GROUPING WITH SHEETS HAVING ADHESIVE OR COHESIVE MATERIAL APPLIED THERETO", now abandoned; which is a continuation of U.S. Ser. No. 07/502,358, filed Mar. 29, 1990, entitled "WRAPPING A FLORAL GROUPING WITH SHEETS HAVING ADHESIVE OR COHESIVE MATERIAL APPLIED THERETO", now abandoned.

FIELD OF THE INVENTION

The present invention relates generally to methods for wrapping floral groupings or flower pot or both wherein the floral grouping or flower pot or both are wrapped with a sheet of material constructed of paper having a pattern embossed thereon.

BRIEF DESCRIPTION OF THE DRAWINGS

FIG. 1 is a plan view of a sheet of material constructed in accordance with the present invention.

FIG. 2 is a sectional view of the sheet of material shown in FIG. 1 taken substantially along the lines 2—2 of FIG. 1.

FIG. 3 is a plan view the sheet of material of FIGS. 1 and 2 showing a floral grouping disposed thereon prior to the sheet of material being wrapped about the floral grouping.

FIG. 4 is a partial perspective view showing the sheet of material of FIGS. 1–3 wrapped about the floral grouping.

FIG. 5 is a partial perspective view similar to FIG. 4, but showing the sheet of material of FIGS. 1–3 wrapped about the floral grouping in a different manner as compared to that shown in FIG. 4.

FIG. 6 is a plan view of a modified sheet of material, similar to the sheet of material shown in FIG. 1, but having a bonding material disposed thereon.

FIG. 7 is a partial perspective view showing the sheet of material of FIG. 6 wrapped about a floral grouping.

FIG. 8 is a schematic view illustrating the embossing of the pattern on the sheets of material described herein and showing the printing of a pattern on those same materials.

FIG. 9 is a schematic view, similar to FIG. 8, but showing a modified system for embossing the pattern on the sheets of material described herein and printing a pattern on those sheets of material.

FIG. 10 is a perspective view of a pot cover constructed using the sheet of material shown in FIG. 1.

FIG. 11 is a sectional view showing the pot cover of FIG. 10 disposed about a flower pot having a floral grouping disposed therein.

FIG. 12 is a view of another modified sheet of material, similar to the sheet of material shown in FIG. 1, but having a plurality of spots of bonding material disposed thereon.

3

Figure 14:
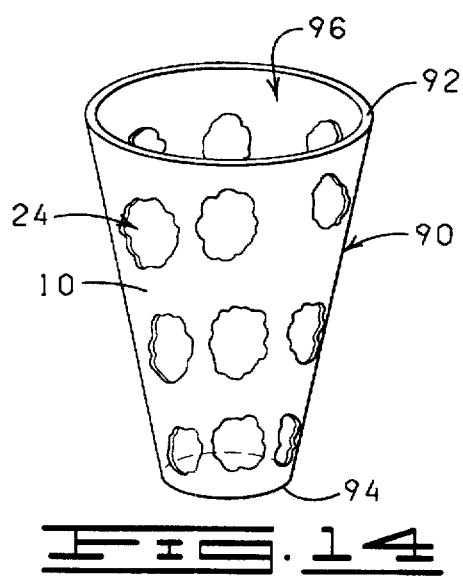
FIG. 14 is a partial perspective view showing a plant sleeve constructed of paper and having an embossed pattern thereon.
Figure 15:
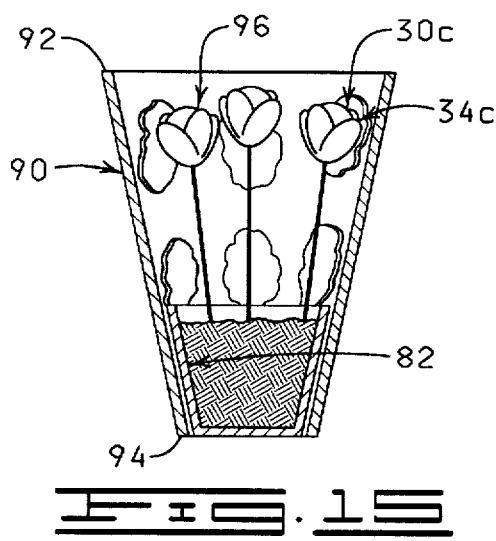

FIG. 15 is a partial sectional view showing the plant sleeve of FIG. 14 disposed about a flower pot and the floral grouping disposed in the flower pot.

Figure 16:
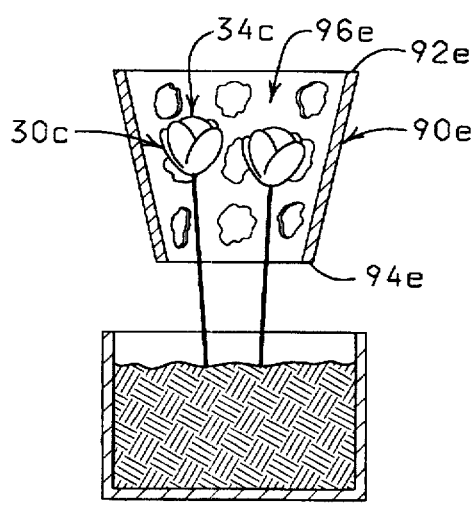

FIG. 16 is a sectional view of a flower pot having a floral grouping therein with a modified plant sleeve disposed about the bloom end of the floral grouping.

Figure 17:
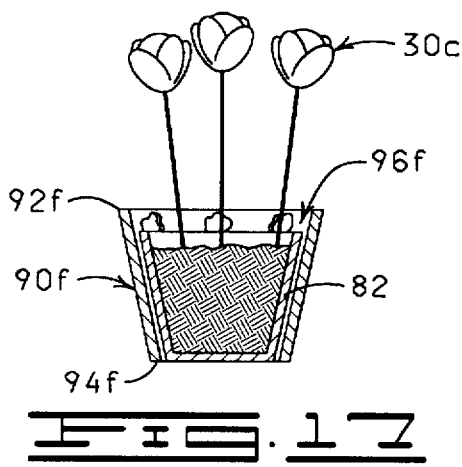

FIG. 17 is a partial sectional view of a flower pot having a floral grouping disposed therein and having another modified plant sleeve disposed about the flower pot.

Figure 18:
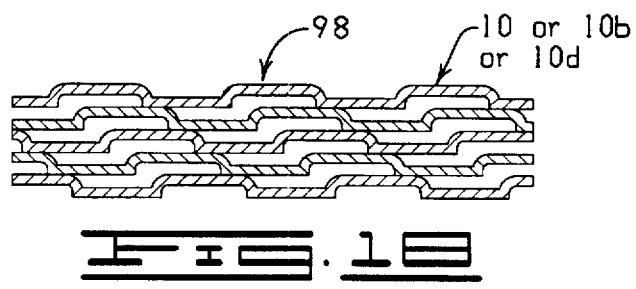

FIG. 18 is a pad of a plurality of sheets of material constructed in accordance with the present invention.

FIG. 19 is a partial perspective view of a roll of material where the sheets of material constructed in accordance with the present invention are separated from the roll of material by tearing along the lines of perforations.

FIG. 20 is a partial perspective view of a roll of material where the sheets of material constructed in accordance with the present invention are separated from the roll of material by a knife cutting the sheet of material from the roll of material.

FIG. 21 is a schematic view showing a roll of material where a bonding material is applied to the roll of material and the sheets of material constructed in accordance with the present invention are cut from the roll of material by way of a knife.

DESCRIPTION OF THE PREFERRED EMBODIMENTS

Shown in FIGS. 1 and 2 is a sheet of material constructed in accordance with the present invention. The sheet of material 10 is constructed of paper. Any form of paper such as paper commonly referred to as Kraft or newsprint paper is suitable for use with the present invention.

The sheet of material 10 is rectangular or square shape as shown in FIG. 1, although the sheet of material 10 may be any other shape such as elliptical or round or die cut into any shape such as a rose shape for example. The sheet of material 10 has a first side 12, second side 14, a first end 16, a second end 18, an upper surface 20 and a lower surface 22.

An embossed pattern 24 is formed in the sheet of material 10. The embossed pattern may be any one of a number of patterns such as depictions of flowers or logos or meaningless designs for example. The embossed pattern 24 forms a plurality of spaced apart raised portions 26 in the upper surface 20 of the sheet of material 10 (only one of the raised portions 26 is designated with the reference numeral in FIG. 2). The embossed pattern 24 also forms a plurality of corresponding depressed portions 28 (only one of the depressed portions 28 being designated with the reference numeral of FIG. 2) in the lower surface 22 of the sheet of material 10. Each of the depressed portions 28 corresponds to one of the raised portions 26. The embossed pattern 24 may cause the raised portions 26 and the corresponding depressed portions 28 to be uniformly raised and depressed or each of the raised portions 26 in corresponding depressed portions 28 may include portions raised and depressed to different heights as may be desired in a particular application.

In operation, the sheet of material 10 constructed of paper is embossed to provide the embossed pattern 24 thereon. A floral grouping 30 (FIGS. 3 and 4) having a stem end 32 (FIGS. 3 and 4) and a bloom end 34 (FIGS. 3 and 4) is placed on the lower surface 22 of the sheet of material 10 (as shown in FIG. 3). It should be noted that the floral grouping 30 may be placed on the upper surface 20 of the sheet of material 10 if desired in a particular application. The sheet of material 10 then is wrapped about the floral grouping 30 to provide a wrapper 36 (shown in FIG. 4) which encompasses a substantial portion of the floral grouping.

The wrapper 36 has an upper end 38 (FIG. 4) and a lower end 40 (FIG. 4). As illustrated in FIG. 4, the upper end 38 is opened and the lower end 40 is opened. The wrapper 36 encompasses a substantial portion of the floral grouping with the stem end 32 of the floral grouping extending through the open lower end 40 of the wrapper 36. The bloom end 34 of the floral grouping is exposed via the open upper end 38 of the wrapper 36.

As shown in FIG. 5, the sheet of material 10 is wrapped about the floral grouping 30 in a slightly different manner as compared to that described before with respect to FIG. 4 to provide a modified wrapper 36a. As shown in FIG. 5, the stem end 32 of the floral grouping 30 does not extend through the lower end 40a of the wrapper 36 and the bloom end 34 of the floral grouping 30 is disposed below the upper end 38a of the wrapper 36a. The lower end 40a may be closed by simply crimping portions of the sheet of material adjacent the lower end 40a together or by securing the lower end 40a in a closed position by tying a string or ribbon or other securing means about the lower end 40a of the wrapper 36a. By the same token, the upper end 38a of the wrapper 36 may be closed in a similar manner if desired in a particular application.

With either the wrapper 36 or the wrapper 36a, the sheet of material 10 is wrapped about the floral grouping 30 to a position wherein a portion of the sheet of material 10 overlaps other portions of the sheet of material 10 to form a conically shaped continuous wrapper 36 or 36a. The wrapper 36 or 36a may be secured in this wrapped position about the floral grouping 30a by taping the overlapping portion of the sheet of material 10 to the adjacent portions to the sheet of material 10 or by bonding the overlapping portion of the sheet of material 10 to the adjacent portions of the sheet of material 10 or by tying a ribbon or string or other binder around the wrapper 36 or 36a to secure the sheet of material in the conically shaped form of the wrapper 36 or 36a if desired in a particular application. "Floral grouping" as used herein means cut fresh flowers, artificial flowers, a single flower, other fresh and/or artificial plants or other floral materials and may include other secondary plants and/or ornamentation which add to the aesthetics of the overall floral grouping.

The sheet of material 10 in addition to the embossed pattern 24 may include a decorative pattern printed on the upper surface 20 or the lower surface 22 or both if desired. The decorative pattern may be a solid color or a printed pattern comprising one or more colors. The upper surface 20 or the lower surface 22 or both of the sheet of material 10 may include a metallic finish.

EMBODIMENT OF FIGS. 6 AND 7

Shown in FIG. 6 is a modified sheet of material 10b which is constructed exactly like the sheet of material 10 shown in FIGS. 1 and 2 and described in detail before, except the sheet of material 10b also includes a bonding material 42 disposed on the lower surface 22b near the second side 14b and extending between the first and the second ends 16b and 18b of the sheet of material 10b.

The bonding material 42 preferably is an adhesive or pressure sensitive adhesive material. The bonding material 42 may be a cohesive material; however, in that event, a corresponding strip of spot of cohesive material also must be applied to the upper surface 20b of the sheet of material 10b to connect with the cohesive material 42 on the lower surface 22b of the sheet of material 10b.

The term "bonding material" as used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" as used herein also means a heat sealing lacquer which may be applied to the sheet of material and, in this instance, heat also must be applied to effect the sealing. The term "bonding material" as used herein means any type of material or thing which can be used to effect the bonding or connecting of the two adjacent portions of the material or sheet of material to effect the connection or bonding described herein. The term "bonding material" also includes labels, bands, ribbons, strings, tape, staples or combinations thereof. Some of the bonding materials would secure the ends of the material while other bonding material may bind the circumference of the wrapper.

The sheet of material 10b is wrapped (shown in FIG. 7) about the floral grouping 30 in the same manner as described before either with respect to FIG. 4 or FIG. 5. A portion of the sheet of material 10b near the second side 14b thereof overlaps portions of the sheet of material 10b when wrapped about the floral grouping 30 and the bonding material 42 bondingly engages the overlapping portion and bondingly connects the overlapping portion to secure the sheet of material 10b in the form of the wrapper 36b as shown in FIG. 7.

Sheets of material with bonding material thereon for wrapping about a floral grouping are disclosed in U.S. Pat. No. 5,111,637; issued May 12, 1992, entitled, "Method For Wrapping A Floral Grouping"; U.S. Pat. No. 5,111,638, issued May 12, 1992, entitled, "Method For Wrapping an Object With A Material Having Pressure Sensitive Adhesive Thereon" and U.S. Pat. No. 5,181,634, issued Jan. 26, 1993, entitled, "Wrapping A Floral Grouping With Sheets Having Adhesive or Cohesive Material Applied" and the descriptions in these patents are specifically incorporated herein by reference.

EMBODIMENT OF FIG. 8

Shown in FIG. 8 schematically is a system for embossing the sheet of material 10 or 10b and for printing a color or colors on the sheet of material 10a or 10b.

As shown in FIG. 8, a roll of material 44 (the material being constructed of paper) is rollingly supported and one end of the roll of material 44 is passed between a pair of embossing rollers 46 and 48. The embossing roller 46 has a plurality of raised portions 50 (only one of the raised portions 50 being designated as the reference numeral in FIG. 8).

The embossing roller 48 has a plurality of depressed portions 52 (only one of the depressed portions 52 being designated as the reference numeral in FIG. 8). The depressed portions 52 are arranged on the embossing roller 48 to correspond and register with the raised portions 50 on the embossing roller 46.

An ink roller 54 is disposed near the embossing roller 46 and positioned to apply ink to the raised portions 50 of the embossing roller 46.

The material is passed between the embossing rollers 46 and 48 in the direction 56 and the embossing rollers 46 and 48 are rotated in the respective directions 58 and 60. As the material is passed between the embossing rollers 46 and 48, the raised portions 50 engage the paper material and force the material into the corresponding depressed portion 52 thereby forming the raised portions 26 and depressed portions 28 in the paper material. The ink roller 54 rotates in a direction 62 and applies ink to the raised portions 50. The raised portions 50 having the ink thereon transfer the ink to the paper material thereby applying a color to the raised portions 26 simultaneously with the forming of the raised portions 26 and depressed portions 28.

The material then is passed under a knife 64. After a predetermined amount of material is passed under the knife 64, the knife 64 is moved to engage and cut the material from the roll of material thereby cutting the sheet of material 10 or 10b from the roll of material 44.

The embossing rollers 46 and 48 each may be constructed of a metal. In some instances, a paper embossing roller 48 is used and, in this instance, it is not necessary to preform the depressed portions 52 and the embossing roller 48 since the depressed portions will somewhat automatically be formed by the raised portions 50 engaging the paper embossing roller 48 and depressing the engaged portions of the paper embossing roller 48.

It should be noted that the ink roller 54 could be positioned to apply ink to the depressed portions 52 or the corresponding raised portions on the embossing roller 48 if desired in a particular application.

EMBODIMENT OF FIG. 9

Shown in FIG. 9 is a system for forming the embossed pattern 24 or 24b on the respective sheets of material 10 or 10b. In the system shown in FIG. 9, the ink roller 54 is disposed ahead of the embossing rollers 46 and 48 to apply a color or colors to the paper material prior to the material being embossed by the embossing rollers 46 and 48. Otherwise, the system shown in FIG. 9 operates in a manner exactly like that described before with respect to the system shown in FIG. 8.

It should be noted, that the ink roller 54 could be positioned past the embossing rollers 46 and 48 so that the color or colors as applied to the sheet of material after the embossed pattern 24 or 24b has been depressed thereon by the embossing rollers 46 and 48. It also should be noted that an additional ink roller could be included for applying a color or colors to the opposite surface of the sheet of material if desired in a particular application.

Systems for embossing sheets of material including paper sheets of material are well known in the art and a detailed description of such systems and the embossing roller or ink rollers used therein is not deem necessary herein.

EMBODIMENT OF FIGS. 10 AND 11

Shown in FIG. 10 is a pot cover 66 which is formed from the sheet of material 10 shown in FIG. 1. The pot cover 66 includes a base 68 having an upper end 70 and a lower end 72. An object opening 74 is formed through the upper end 70 and the object opening 74 extends a distance between the upper end 70 and the lower end 72. The object opening 74 is sized to receive a pot or flower pot. A skirt 76 is formed on the upper end 70 and the skirt 76 extends a distance outwardly from the upper end 70 of the base 68.

The pot cover 66 is formed by placing the sheet of material 10 between a male and a female die. The dies are brought together with the sheet of material 10 being disposed therebetween to form the sheet of material 10 into the pot cover 66. During this forming process, a plurality of overlapping folds 80 are formed in the base 68 of the pot cover 66. The overlapping folds 80 extend at various and a different distances and at various and different angles over the base 68 of the pot cover 66.

The system for forming the pot cover 66 is described in detail in U.S. Pat. No. 4,772,182, entitled, "Article Forming System", issued Sep. 27, 1988, the description of this patent specifically being incorporated herein by reference.

As shown in FIG. 11, a flower pot 82 is disposed in the object opening 74 of the pot cover 66. The base 68 covers a substantially portion of an outer peripheral surface 84 of the flower pot 82. The skirt 76 extends a distance outwardly and upwardly from an upper end 86 of the flower pot 82. The flower pot 82 has a floral grouping 30c disposed therein and the floral grouping 30c extends a distance upwardly from the upper end 86 of the flower pot 82. The pot cover 66 provides a decorative covering for the flower pot 82.

EMBODIMENT OF FIGS. 12 AND 13

Shown in FIG. 12 is a modified sheet of material 10d which is constructed exactly like the sheet of material 10 shown in FIG. 1, except the sheet of material 10d also includes a plurality of spaced apart spots of bonding material 88 disposed on the upper surface 20 thereof. It should be noted that in lieu of the spots of the bonding material 88, the bonding material 88 could be applied to the upper surface 20d of the sheet of material 10d in the form of strips or any other geometric shape and the bonding material 88 also could be applied only on the raised portions 26d of the embossed pattern 24d or the bonding material 88 may be incorporated in the ink applied to the upper surface 20 in the form of a decorative pattern.

In operation, the flower pot 82 is placed on the upper surface 20d of the sheet of material 10d. In this position, the sheet of material 10d is formed about the outer peripheral surface 84 of the flower pot 82 (shown in FIG. 13) such that the sheet of material 10d substantially encompasses and covers the outer peripheral surface 84. The bonding material 88 is brought into engagement with the outer peripheral surface 84 of the flower pot 82 as the sheet of material 10d is formed about the flower pot 82. The bonding material 88 bondingly engages the outer peripheral surface 84 of the flower pot 82 bondingly connecting the sheet of material 10d to the outer peripheral surface 84 of the flower pot 82. A portion of the sheet of material 10d extends outwardly and upwardly from the upper end 86 of the flower pot 82 to form the skirt portion of the covering provided by the sheet of material 10d.

It also should be noted that the bonding material 88 may be applied to the lower surface 22d of the sheet of material 10d. In this instance, the sheet of material 10d would be applied to the flower pot 82 in a manner exactly like that described before, except the flower pot 82 would be adjacent the lower surface 22d of the sheet of material 10d and the lower surface 22d would be positioned adjacent the outer peripheral surface 84 of the flower pot 82.

EMBODIMENT OF FIGS. 14, 15, 16 AND 17

Shown in FIG. 14 is a sleeve 90 constructed from the sheet of material 10 shown in FIG. 1 and described in detail before. The sleeve 90 has an upper end 92 and a lower end 94. The sleeve 90 is frusto-conically shaped and has an opening 96 extending therethrough intersecting the upper end 92 and the lower end 94.

The sleeve 90 may be constructed by taking the sheet of material 10 shown in FIG. 1 and cutting the sheet of material 10 in the form of two trapezoidally shaped sheets and then attaching those two sheets together along two edges of each sheet to form the frusto-conically shaped sleeve 90 shown in FIG. 14. In the alternative, two rolls of material having the embossed pattern thereon may be connected at spaced apart places to form the frusto-conically shaped sleeves and then the formed frusto-conically shaped sleeves may then be separated from the combined materials. There are various commercially available methods for forming sleeves such as the sleeve 90 and any of these commercially available methods or systems can be used to form the sleeve 90. These prior art systems for forming the sleeve 90 are well known in the art and a detailed description of the apparatus and methods for forming such sleeve shaped objects is not deemed necessary herein.

As shown in FIG. 15, the flower pot 82 with the floral grouping 30 disposed therein is disposed in the opening 96 of the sleeve 90. The flower pot 82 is positioned near the lower end 94 of the sleeve 90 and the sleeve 90 substantially encompasses the outer peripheral surface 84 of the flower pot, except for the bottom of the flower pot 82 which is disposed adjacent the open lower end 94 of the sleeve 90. A portion of the sleeve 90 also encompasses and surrounds the floral grouping 30. Preferably, a portion of the sleeve 90 extends above the bloom end 34c of the floral grouping 30. The sleeve 90 provides a protective and a decorative covering for the flower pot 82 and the floral grouping 30 disposed therein.

Shown in FIG. 16 is a modified sleeve 90e which is constructed exactly like the sleeve 90 shown in FIG. 14 and described in detail before, except the sleeve 90e is smaller than the sleeve 90 shown in FIG. 14. The sleeve 90e is positioned over and encompasses only the bloom end 34c of the floral grouping 30 to provide a protective and a decorative covering for the bloom end 34c of the floral grouping 30c with the bloom end 34c being disposed in the opening 96e of the sleeve 90e.

Shown in FIG. 17 is another modified sleeve 90f which is constructed exactly like the sleeve 90 shown in FIG. 14, except the sleeve 90f is smaller in the sense that the distance between the upper end 92f and the lower end 94f is smaller than the distance between the upper and the lower ends 92 and 94 of the sleeve 90. In this instance, the flower pot 82 is positioned in the opening 96f of the sleeve 90f and the sleeve 90f is sized to encompass only the outer peripheral surface of the flower pot 84, but not extend over and about the floral grouping 30.

EMBODIMENT OF FIG. 18

Shown in FIG. 18 is a pad 98 of sheets of material 10 or 10b or 10d with each of the sheets of material being constructed in a manner like that described before with respect to the sheets of material shown in FIGS. 1, 6 or 12. In those instances where the sheets of material in the pad 98 are constructed like the sheet of material 10b shown in FIG. 6, the bonding material 42 bondingly and releasably connects each of the sheets of material to the adjacent sheet of material to form the pad 98. The sheets of material are disconnected or removed from the pad 98 and wrapped about the floral grouping or about a flower pot in the manners described before. A pad of sheets of material for wrapping about floral groupings is disclosed and described in detail in U.S. Pat. No. 5,181,364, referred to before and incorporated herein by reference.

EMBODIMENT OF FIG. 19

Shown in FIG. 19 is a roll of material 100 having a plurality of sheets of material such as the sheet of material 10 or 10b or 10d disposed thereon and separated by lines of perforations 102. In this embodiment, the material is unrolled from the roll of material 100 and the sheets of material 10 or 10b or 10d are separated from the roll of material 100 by tearing along the lines of perforations 102.

EMBODIMENT OF FIG. 20

Shown in FIG. 20 is a roll of material 100g which is constructed exactly like the roll of material 100 shown in FIG. 19, except the roll of material 100g does not include the lines of perforations 102. In this embodiment, the material is unrolled from the roll of material 100g and, after a predetermined amount of material has been unrolled from the roll of material 100g, a knife 104 is activated or manually manipulated to cut the material from the roll of material 100g thereby separating a sheet of material 10 or 10b or 10d from the roll of material 100g. The separated sheet of material 10 or 10b or 10d is constructed exactly like the sheets of material shown in FIGS. 1 or 6 or 12 for example.

EMBODIMENT OF FIG. 21

Shown in FIG. 21 is another roll of material 100h. The roll of material 100h is constructed exactly like the roll of material 100 shown in FIG. 19 and described in detail before, except the roll of material 100h does not include the lines of perforation 102. The material is unrolled from the roll of material 100h and passed through an adhesive applicator 106 where bonding material is applied to the material to form a sheet of material like the sheet of material 10b shown in FIG. 6. The material further is unrolled from the sheet of material and, after a predetermined amount of material has been unrolled from the roll of material 100h, a knife 108 is activated or manually manipulated to cut the sheet of material 10b from the roll of material 100h.

The embossed paper sheets of material described herein provide more rigidity as compared an unembossed paper sheet of material. Lighter material thus can serve the same purpose as compared to heavier sheets of paper material. Further, the embossed paper sheets of material described herein give the appearance in a roll or a stack of such sheets of material of more material or volume of material being contained in such roll or stack. The embossing of the paper sheets of material also adds strength to the material. In addition, the embossing of the paper sheets of material described herein provides more absorbency per square inch as compared to unembossed paper sheets of material and thus the embossed paper sheets of material described herein absorb more moisture or absorb the moisture quicker. The embossed paper sheets of material described herein also provide an insulating quality due to the air space formed by the embossed pattern.

Changes may be made in the steps or the sequence of steps of the methods described herein without departing from the spirit and scope of the invention as defined in the following claims.

What is claimed is:

1. A method for providing a decorative covering for a flower pot comprising:

providing a sheet of material constructed of paper having an upper surface and a lower surface, the sheet of material having an embossed pattern embossed thereon and a printed pattern on the embossed pattern;

providing the flower pot having an upper end, a lower end and an outer peripheral surface; and forming the sheet of material about the outer peripheral surface of the flower pot to provide the decorative covering.

2. The method of claim 1 wherein the step of providing the sheet of material is further defined as providing the sheet of material having a bonding material thereon, and wherein the step of wrapping the sheet of material about the flower pot is defined further as wrapping the sheet of material about the flower pot with the bonding material bondingly connecting the sheet of material to the flower pot.

3. A method for providing a decorative covering for a flower pot comprising:

providing a sheet of material constructed of paper having an upper surface and a lower surface, the sheet of material having an embossed pattern embossed thereon and a printed pattern printed on the embossed pattern;

forming the sheet of material into a pot cover having a plurality of overlapping folds therein wherein the overlapping folds extend at various angles and at various instances, the pot cover having an object opening formed through an upper end thereof sized to receive a flower pot;

providing the flower pot having an outer peripheral surface; and disposing the flower pot in the object opening of the pot cover with the pot cover encompassing a substantial portion of the outer peripheral surface of the flower pot to provide the decorative covering.

4. A method for covering a flower pot comprising:

forming a sleeve constructed of paper wherein the paper is provided with an embossed pattern thereon and a printed pattern in register with the emobssed pattern, the sleeve having an upper end and a lower end and an opening extending therethrough intersecting the upper end thereof;

providing the flower pot; and disposing the flower pot in the opening in the sleeve whereby the sleeve encompasses a substantial portion of the flower pot.

5. A method for providing a decorative covering for a flower pot comprising:

providing a sleeve constructed of paper and having an embossed pattern thereon and a printed pattern printed on the embossed pattern, the sleeve having an upper end and a lower end and an opening extending therethrough intersecting the upper end thereof;

providing the flower pot with a floral grouping disposed therein;

disposing the floral grouping in the opening in the sleeve with the sleeve encompassing a substantial portion of the flower pot and the floral grouping to provide the decorative cover.

6. A method for providing a decorative covering for a flower pot comprising:

providing a sheet of material having an embossed pattern embossed thereon and a printed pattern on the embossed pattern;

providing the flower pot having an upper end, a lower end and an outer peripheral surface; and forming the sheet of material about the outer peripheral surface of the flower pot to provide the decorative covering.

7. The method of claim 6 wherein the step of providing the sheet of material is further defined as providing the sheet of material having a bonding material thereon, and wherein the step of wrapping the sheet of material about the flower pot is defined further as wrapping the sheet of material about the flower pot with the bonding material bondingly connecting the sheet of material to the flower pot.

8. A method for providing a decorative covering for a flower pot comprising:

providing a sheet of material having an embossed pattern and a printed pattern in register with the embossed pattern;

forming the sheet of material into a pot cover having a plurality of overlapping folds therein wherein the overlapping folds extend at various angles and at various instances, the pot cover having an object opening formed through an upper end thereof sized to receive a flower pot;

providing the flower pot having an outer peripheral surface; and disposing the flower pot in the object opening of the pot cover with the pot cover encompassing a substantial portion of the outer peripheral surface of the flower pot to provide the decorative covering.

9. A method for covering a flower pot comprising:

forming a sleeve from a sheet of material having an embossed pattern and a printed pattern in register with the embossed pattern, the sleeve having an upper end and a lower end and an opening extending therethrough intersecting the upper end thereof;

providing the flower pot; and disposing the flower pot in the opening in the sleeve whereby the sleeve encompasses a substantial portion of the flower pot.

10. A method for providing a decorative covering for a flower pot comprising:

providing a sleeve constructed of a sheet of material having an embossed pattern and a printed pattern printed on the embossed pattern, the sleeve having an upper end and a lower end and an opening extending therethrough intersecting the upper end thereof;

providing the flower pot with a floral grouping disposed therein;

disposing the floral grouping in the opening in the sleeve with the sleeve encompassing a substantial portion of the flower pot and the floral grouping to provide the decorative cover.

11. A method for providing a decorative covering for a flower pot comprising:

providing a sheet of material having an embossed pattern and a printed pattern;

providing the flower pot having an upper end, a lower end and an outer peripheral surface; and forming the sheet of material about the outer peripheral surface of the flower pot to provide the decorative covering.

12. The method of claim 11 wherein the step of providing the sheet of material is further defined as providing the sheet of material having a bonding material thereon, and wherein the step of wrapping the sheet of material about the flower pot is defined further as wrapping the sheet of material about the flower pot with the bonding material bondingly connecting the sheet of material to the flower pot.

13. A method for providing a decorative covering for a flower pot comprising:

providing a sheet of material having an embossed pattern and a printed pattern;

forming the sheet of material into a pot cover having a plurality of overlapping folds therein wherein the overlapping folds extend at various angles and at various instances, the pot cover having an object opening formed through an upper end thereof sized to receive a flower pot;

providing the flower pot having an outer peripheral surface; and disposing the flower pot in the object opening of the pot cover with the pot cover encompassing a substantial portion of the outer peripheral surface of the flower pot to provide the decorative covering.

14. A method for covering a flower pot comprising:

forming a sleeve from a sheet of material having an embossed pattern and a printed pattern, the sleeve having an upper end and a lower end and an opening extending therethrough intersecting the upper end thereof;

providing the flower pot; and disposing the flower pot in the opening in the sleeve whereby the sleeve encompasses a substantial portion of the flower pot.

15. A method for providing a decorative covering for a flower pot comprising:

providing a sleeve constructed of a sheet of material having an embossed pattern and a printed pattern, the sleeve having an upper end and a lower end and an opening extending therethrough intersecting the upper end thereof;

providing the flower pot with a floral grouping disposed therein;

disposing the floral grouping in the opening in the sleeve with the sleeve encompassing a substantial portion of the flower pot and the floral grouping to provide the decorative cover.

* * * * *

UNITED STATES PATENT AND TRADEMARK OFFICE
CERTIFICATE OF CORRECTION

PATENT NO.    : 5,752,360
DATED         : May 19, 1998
INVENTOR(S)   : Donald E. Weder It is certified that error appears in the above-identified patent and that said Letters Patent is hereby corrected as shown below:

The title page showing the illustrative figure should be deleted to be replaced with the attached title page.

<u>Title page, Item [54] and Column 1, line 2,</u>
In the title, after "SHEET" and before "MATERIAL" insert -- OF --.

<u>Title page,</u>
Item [56], after the last entry of the U.S. PATENT DOCUMENTS, (i.e., "5,381,642 1/1995 Weder et al.") insert
-- 5,634,318    6/1997 Weder    53    411 xr
   5,661,951    9/1997 Weder    53    411 xr --

United States Patent [19]
Weder

[11] Patent Number: 5,752,360
[45] Date of Patent: May 19, 1998

[54] METHOD FOR WRAPPING A FLOWER POT WITH A SHEET MATERIAL CONSTRUCTED OF PAPER AND HAVING A PATTERN EMBOSSED THEREON

[75] Inventor: Donald E. Weder, Highland, Ill.

[73] Assignee: Southpac Trust International, Inc.

[21] Appl. No.: 480,657

[22] Filed: Jun. 7, 1995

Related U.S. Application Data

[63] Continuation of Ser. No. 84,050, Jun. 29, 1993, abandoned, which is a continuation-in-part of Ser. No. 968,798, Oct. 30, 1992, Pat. No. 5,369,934, which is a continuation of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, said Ser. No. 84,050, is a continuation-in-part of Ser. No. 965,585, Oct. 23, 1992, abandoned, which is a continuation of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned, said Ser. No. 84,050, is a continuation-in-part of Ser. No. 968,702, Oct. 30, 1992, abandoned, which is a continuation of Ser. No. 865,504, Apr. 9, 1992, Pat. No. 5,239,804, which is a continuation of Ser. No. 658,413, Feb. 15, 1991, Pat. No. 5,111,637, which is a continuation of Ser. No. 391,463, Aug. 9, 1989, abandoned, said Ser. No. 84,050, is a continuation-in-part of Ser. No. 923,202, Oct. 13, 1993, Pat. No. 5,596,862, which is a continuation-in-part of Ser. No. 803,318, Dec. 4, 1991, Pat. No. 5,344,016, which is a continuation-in-part of Ser. No. 707,417, May 28, 1991, abandoned, which is a continuation of Ser. No. 502,358, Mar. 29, 1990, abandoned.

[51] Int. Cl.⁶ .......................... B65B 61/00; B65B 11/02; B65B 25/02
[52] U.S. Cl. .................. 53/397; 53/410; 53/411; 53/459; 53/464; 53/465
[58] Field of Search .................. 53/397, 398, 410, 53/411, 452, 453, 456, 461, 465, 464, 459; 47/72; 229/3.5 R, 87.01

[56] References Cited

U.S. PATENT DOCUMENTS

| | | |
|---|---|---|
| Re. 21,065 | 5/1939 | Copeman. |
| 682,817 | 9/1901 | Shaner. |
| 732,889 | 7/1903 | Paver. |
| 898,273 | 9/1908 | Sigler et al.. |
| 1,446,563 | 2/1923 | Hughes. |
| 1,525,015 | 2/1925 | Weeks. |
| 1,818,198 | 8/1931 | Davis. |
| 1,863,216 | 6/1932 | Wordingham. |
| 1,868,283 | 7/1932 | Fleischer. |
| 1,962,722 | 6/1934 | Krueger. |
| 1,978,631 | 10/1934 | Herrlinger. |
| 2,028,878 | 1/1936 | Rider. |
| 2,048,123 | 7/1936 | Howard. |
| 2,094,349 | 9/1937 | Carlson. |
| 2,170,147 | 8/1939 | Lane. |
| 2,278,673 | 4/1942 | Savada et al.. |
| 2,294,670 | 9/1942 | Krueger. |
| 2,302,259 | 11/1942 | Rothfuss. |
| 2,337,808 | 12/1943 | Ford. |
| 2,355,559 | 8/1944 | Renner. |

(List continued on next page.)

FOREIGN PATENT DOCUMENTS

| | | |
|---|---|---|
| 2610604 | 8/1988 | France. |
| 345464 | 12/1921 | Germany. |

OTHER PUBLICATIONS

Speed Cover® Brochure, 1989, Highland Supply Corp. Highland, IL.

Speed Sheets™ and Speed Rolls, 1990 Highland Supply, Highland, IL.

Primary Examiner—Horace M. Culver
Attorney, Agent, or Firm—Dunlap & Codding, P.C.

[57] ABSTRACT

A method for wrapping a floral grouping or flower pot or both wherein a sheet of material constructed of paper and having a pattern embossed thereon and a printed pattern in register with the embossed pattern printed on the embossed pattern is wrapped about at least a portion of the floral grouping or the flower pot or both. The sheet of material may be provided in the form of a pad of a plurality of sheets of material or a roll wherein the sheets of material are separated from the roll of material.

15 Claims, 5 Drawing Sheets

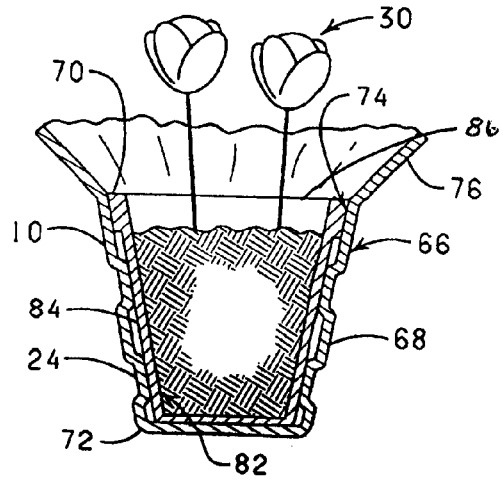

UNITED STATES PATENT AND TRADEMARK OFFICE
CERTIFICATE OF CORRECTION

PATENT NO.   : 5,752,360
DATED        : May 19, 1998
INVENTOR(S)  : Donald E. Weder It is certified that error appears in the above-identified patent and that said Letters Patent is hereby corrected as shown below:

Drawings,
Fig. 3, delete the numeral "12" and substitute -- 14 -- therefor; and delete the numeral "14" and substitute -- 12 -- therefor.

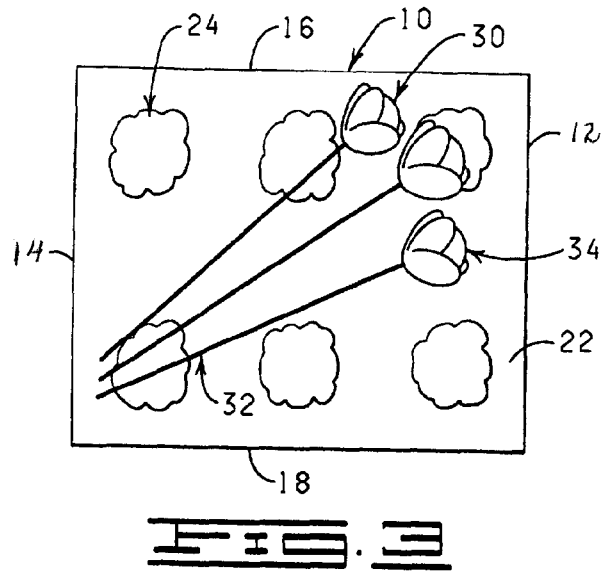

Fig. 4, delete the numeral "22" and substitute therefor -- 20 --; and insert the numeral -- 22 -- and its associated lead line as shown.

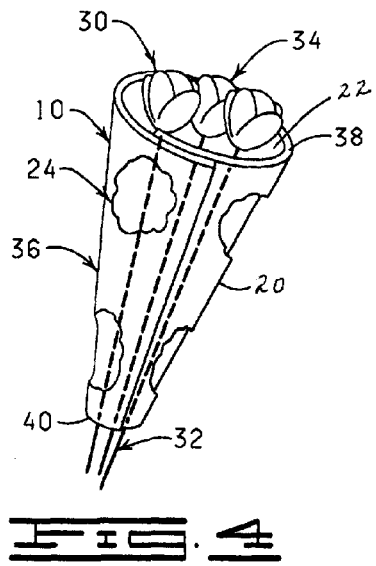

UNITED STATES PATENT AND TRADEMARK OFFICE
CERTIFICATE OF CORRECTION

PATENT NO. : 5,752,360
DATED : May 19, 1998
INVENTOR(S) : Donald E. Weder

It is certified that error appears in the above-identified patent and that said Letters Patent is hereby corrected as shown below:

Drawings (cont'd),
Fig. 5, delete the numeral "22" and substitute therefor -- 20 --; and insert the numeral -- 22 -- and its associated lead line as shown.

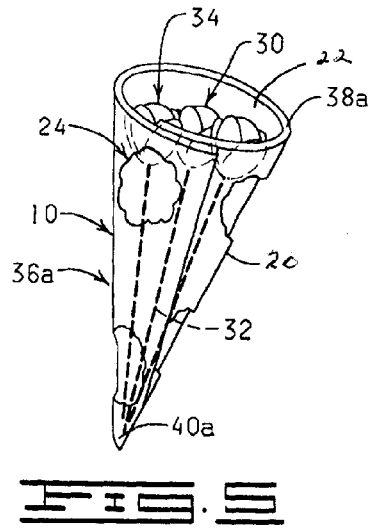

Fig. 6, delete the reference numeral "16b" and substitute therefor -- 18b --; and delete the numeral "18b" and substitute therefor -- 16b --.

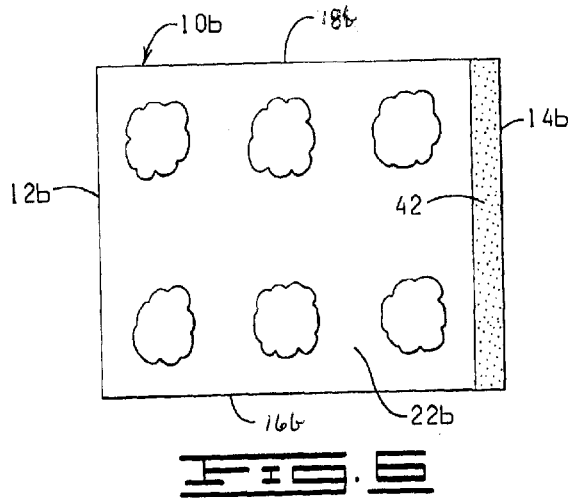

UNITED STATES PATENT AND TRADEMARK OFFICE
CERTIFICATE OF CORRECTION

PATENT NO.    : 5,752,360
DATED         : May 19, 1998
INVENTOR(S)   : Donald E. Weder It is certified that error appears in the above-identified patent and that said Letters Patent is hereby corrected as shown below:

Drawings (cont'd),
Fig. 9, insert the numeral -- 56 -- and its associated lead line.

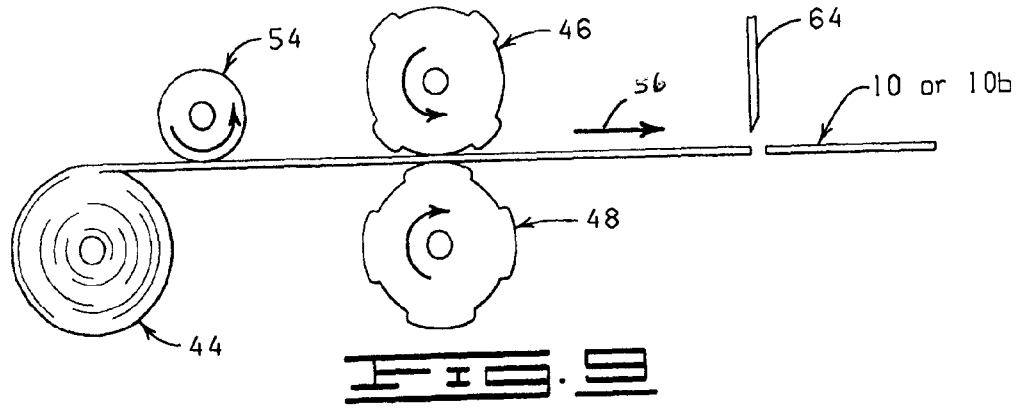

Fig. 11, insert the numeral -- 86 -- and its associated lead line.

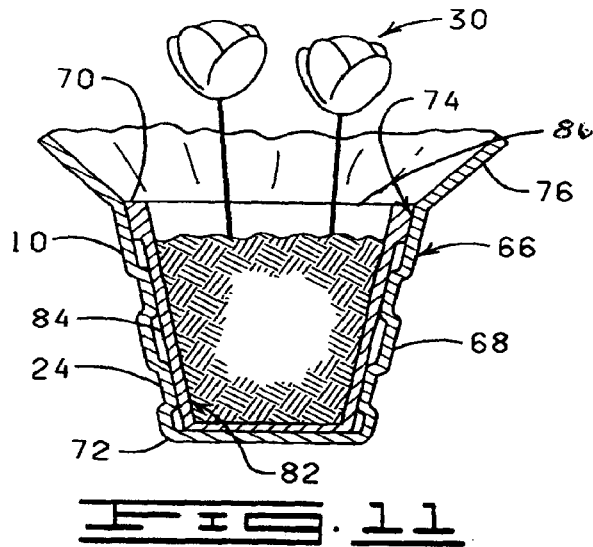

UNITED STATES PATENT AND TRADEMARK OFFICE
CERTIFICATE OF CORRECTION

PATENT NO. : 5,752,360  
DATED : May 19, 1998  
INVENTOR(S) : Donald E. Weder

Page 6 of 10

It is certified that error appears in the above-identified patent and that said Letters Patent is hereby corrected as shown below:

Drawings (cont'd),
Fig. 12, insert the numeral -- 26d -- and its associated lead line.

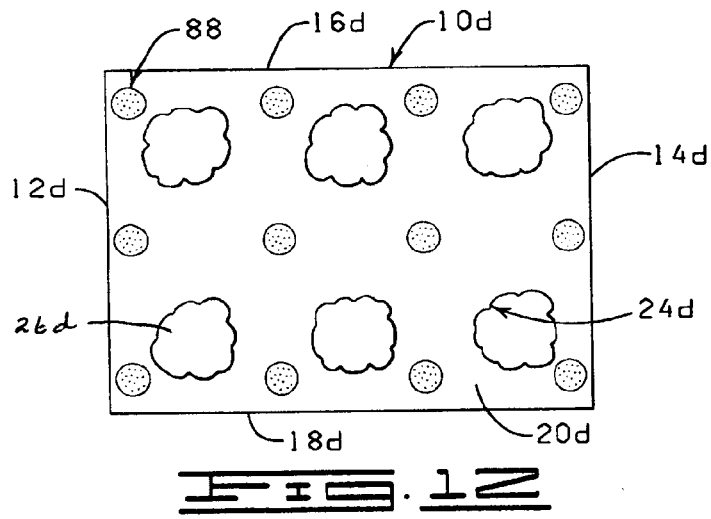

Figure 13:
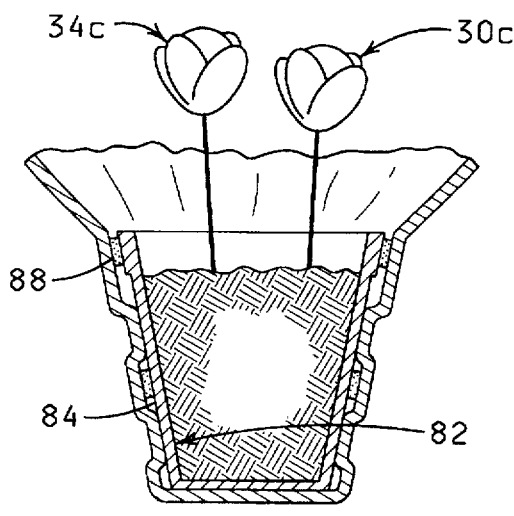
FIG. 13 is a sectional view showing the sheet of material of FIG. 12 wrapped about a flower pot having a floral grouping disposed therein wherein the spots of bonding material secure the sheet of material of FIG. 12 to the flower pot.

Fig. 13, add the numerals -- 10d -- and -- 86 -- and each associated lead line.

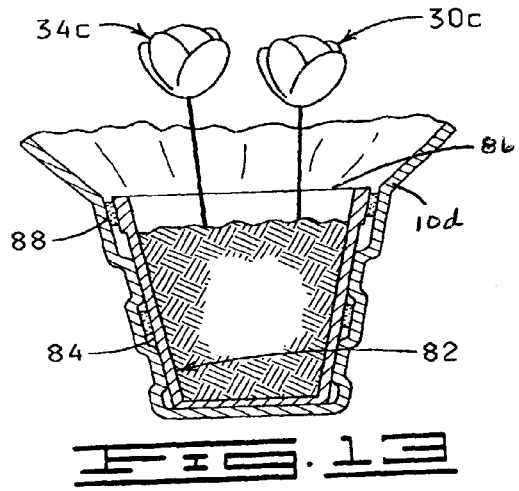

UNITED STATES PATENT AND TRADEMARK OFFICE
CERTIFICATE OF CORRECTION

PATENT NO. : 5,752,360
DATED : May 19, 1998
INVENTOR(S) : Donald E. Weder

It is certified that error appears in the above-identified patent and that said Letters Patent is hereby corrected as shown below:

Drawings (cont'd),
Fig. 15, add the numeral -- 84 -- and its associated lead line.

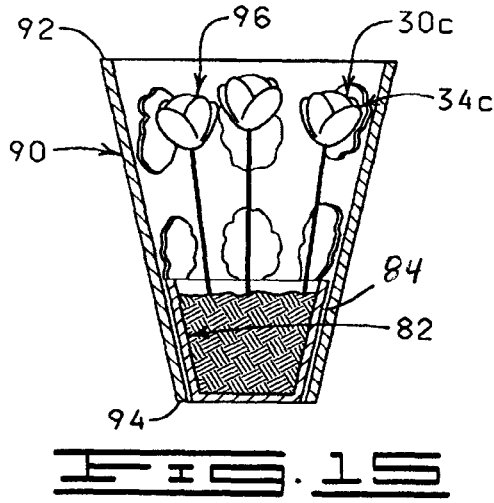

Fig. 17, add the numeral -- 84 -- and its associated lead line.

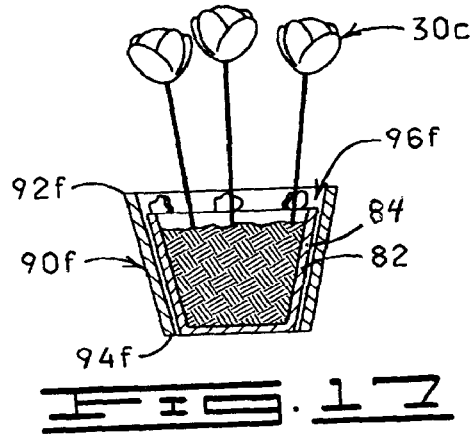

UNITED STATES PATENT AND TRADEMARK OFFICE
CERTIFICATE OF CORRECTION

PATENT NO.    : 5,752,360
DATED         : May 19, 1998
INVENTOR(S)   : Donald E. Weder It is certified that error appears in the above-identified patent and that said Letters Patent is hereby corrected as shown below:

Column 1,
Line 11, delete "AND NOW ABANDONED;" and substitute therefor -- and now abandoned; --;
Lines 13-15, delete "METHOD FOR WRAPPING AN OBJECT WITH A MATERIAL HAVING PRESSURE SENSITIVE ADHESIVE THEREON" and substitute therefor -- METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL --;
Lines 18-20, delete "METHOD FOR WRAPPING AN OBJECT WITH A MATERIAL HAVING PRESSURE SENSITIVE ADHESIVE THEREON" and substitute therefor -- METHODS FOR WRAPPING A FLORAL GROUPING --;
Line 29, delete "AND" and substitute therefor -- ADHESIVE --;
Lines 39-40, delete "GORUPING" and substitute therefor -- GROUPING --;

Column 2,
Line 19, delete "pot" and substitute -- pots -- therefor;
Line 29, after "view" and before "the" insert -- of --;

Column 3,
Line 30, after "material" and before "constructed" insert -- 10 --;
Line 35, delete "shape" and substitute -- shaped -- therefor;
Line 42, after "pattern" and before "may" insert -- 24 --;
Line 56, delete "in" and substitute -- and -- therefor;

Column 4,
Line 4, delete "grouping." and substitute -- grouping 30. -- therefor;
Line 8, after "grouping" and before "with" insert -- 30 --;
Line 9, after "grouping" and before "extending" insert -- 30 --;
Line 11, after "grouping" and before "is" insert -- 30 --;
Lines 18 and 26, delete "36" and substitute therefor -- 36*a* --;
Lines 21 and 39, after "material" insert -- 10 --;
Line 34, delete "30*a*" and substitute therefor -- 30 --;
Line 67, delete "strip of spot" and substitute therefor -- strip or spot --;

Column 5,
Line 42, delete "5,181,634," and substitute -- 5,181,364, -- therefor;

UNITED STATES PATENT AND TRADEMARK OFFICE
CERTIFICATE OF CORRECTION

PATENT NO. : 5,752,360
DATED : May 19, 1998
INVENTOR(S) : Donald E. Weder

It is certified that error appears in the above-identified patent and that said Letters Patent is hereby corrected as shown below:

Column 6,
Line 17, after "material" and before "thereby" insert -- 44, --;
Line 22, delete "and" and substitute therefor -- in --;
Line 42, delete "noted," and substitute -- noted -- therefor;
Line 44, after "material" and before "after" insert -- 10 or 10b --;
Line 49, after "material" and before "if" insert -- 10 or 10b --;

Column 7,
Line 5, delete "a";
Line 9, delete "4,772,182," and substitute -- 4,772,183, -- therefor;
Line 14, delete "substantially portion of an" and substitute -- substantial portion of the -- therefor;
Lines 17 and 18, delete "30c" and substitute therefor -- 30 --;
Line 24, delete "constructed exactly like" and substitute therefor -- similar to --;
Lines 27 and 34, delete "20" and substitute therefor -- 20d --;
Line 50, delete "skirt portion of the covering" and substitute therefor -- skirt 76 of the pot cover 66 --;

Column 8,
Line 9, delete "then";
Lines 19, 29 and 36, delete "30" and substitute -- 30c -- therefor;
Line 23, delete "pot," and substitute -- pot 82, -- therefor;
Lines 26, 27 and 49, delete "30." and substitute -- 30c. -- therefor;
Line 48, after "surface" and before "of" insert -- 84 --; and delete "84," and substitute therefor -- 82, --;
Line 54, after "material" and before "being" insert -- 10 or 10b or 10d --;
Line 56, after "material" and before "shown" insert -- 10 or 10b or 10d --;

Column 9,
Line 36, delete "sheet of material" and substitute -- roll of material 100h -- therefor;

Column 10,
Line 9, delete "wrapping" and substitute -- forming -- therefor;
Line 22, delete "instances," and substitute therefor -- distances, --;
Line 34, delete "emobssed" and substitute -- embossed -- therefor;

UNITED STATES PATENT AND TRADEMARK OFFICE
CERTIFICATE OF CORRECTION

PATENT NO. : 5,752,360
DATED : May 19, 1998
INVENTOR(S) : Donald E. Weder

It is certified that error appears in the above-identified patent and that said Letters Patent is hereby corrected as shown below:

Column 11,
Line 2, delete "wrapping" and substitute therefor -- forming --;
Line 14, delete "instances," and substitute therefor -- distances, --;

Column 12,
Line 7, delete "wrapping" and substitute therefor -- forming --; and
Line 18, delete "instances," and substitute therefor -- distances, --.

Signed and Sealed this

Twenty-ninth Day of July, 2003

JAMES E. ROGAN
*Director of the United States Patent and Trademark Office*